(12) United States Patent
Tabachenko et al.

(10) Patent No.: US 6,270,084 B1
(45) Date of Patent: Aug. 7, 2001

(54) PNEUMATIC CHUCK ASSEMBLY

(75) Inventors: Oleg Tabachenko, Fairlawn, NJ (US); Roman Gelfman, New Britain, CT (US)

(73) Assignee: The Goss & DeLeeuw Machine Co., Kensington, CT (US)

( * ) Notice: Subject to any disclaimer, the term of this patent is extended or adjusted under 35 U.S.C. 154(b) by 0 days.

(21) Appl. No.: 09/094,808

(22) Filed: Jun. 15, 1998

(51) Int. Cl.[7] .................................................. B23B 31/30
(52) U.S. Cl. ....................... 279/4.04; 279/4.01; 279/4.02; 279/4.12
(58) Field of Search ................... 279/4.01, 4.02, 279/4.04, 4.12

(56) References Cited

U.S. PATENT DOCUMENTS

| 2,323,091 | 6/1943 | Johnston et al. . |
| 2,500,383 | 3/1950 | Sadler et al. . |
| 2,768,830 | 10/1956 | Janson . |
| 3,087,737 | 4/1963 | Werth . |
| 3,727,929 | 4/1973 | Fink . |
| 3,730,539 | * 5/1973 | Swanson ............................. 279/4.02 |
| 3,815,929 | * 6/1974 | Steinberger et al. ............... 279/4.02 |
| 4,300,780 | 11/1981 | Urbanic . |
| 4,508,357 | 4/1985 | Reich . |

* cited by examiner

*Primary Examiner*—Steven C. Bishop
(74) *Attorney, Agent, or Firm*—McCormick, Paulding & Huber LLP

(57) ABSTRACT

A rotary chuck having a chuck body supporting a plurality of clamping jaws for movement between open and closed positions and defining a cylindrical piston chamber containing an axially movable double acting piston coupled to a jaw actuator. A plurality of springs contained within the piston chamber apply biasing force to the piston in one axial direction to urge the jaws toward closed positions. An incrementally adjustable pneumatic control system is operable to apply pressure to the piston in opposition to the springs to reduce the resultant clamping force applied by the jaws in closed position. The control system is also operable to act in consort with the springs to increase the resultant clamping force applied by the jaws in closed position.

13 Claims, 6 Drawing Sheets

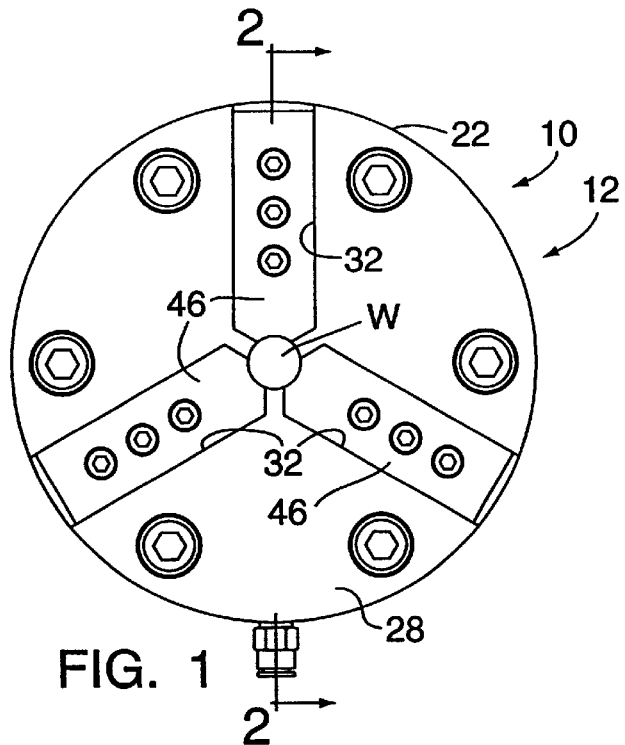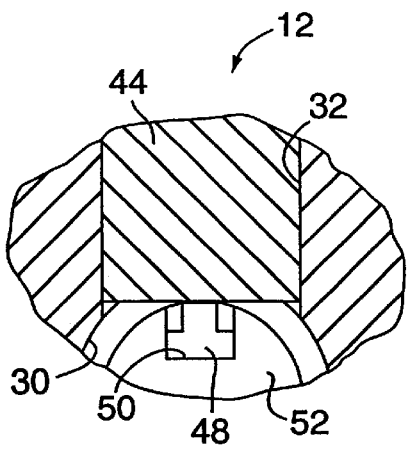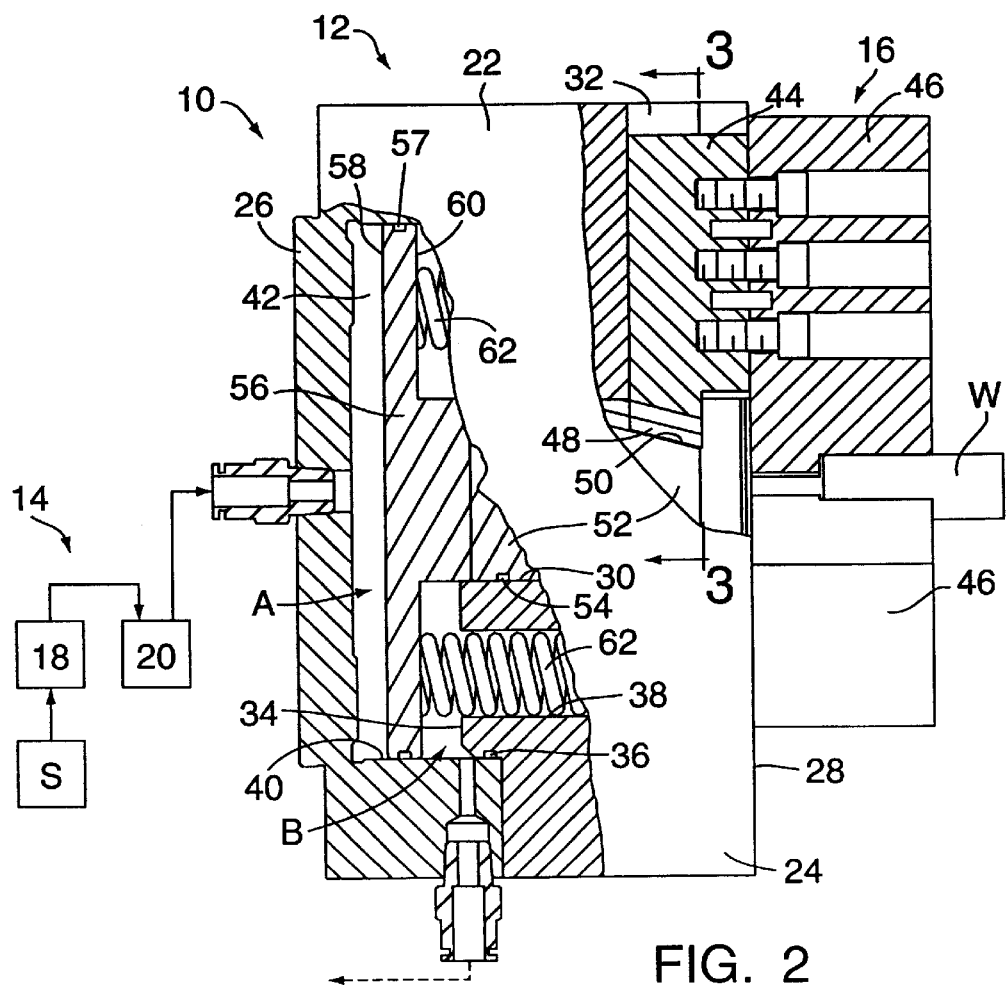

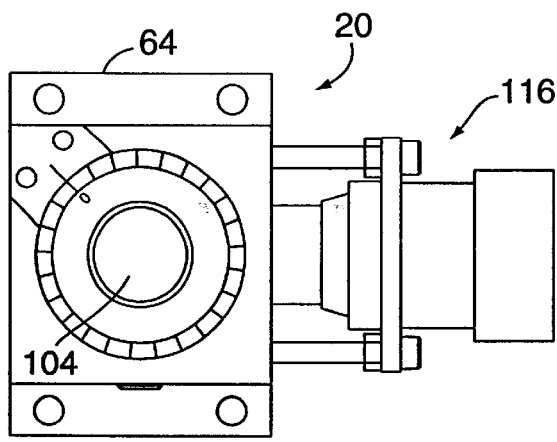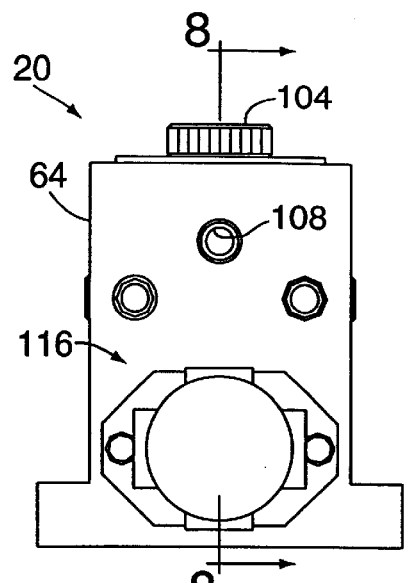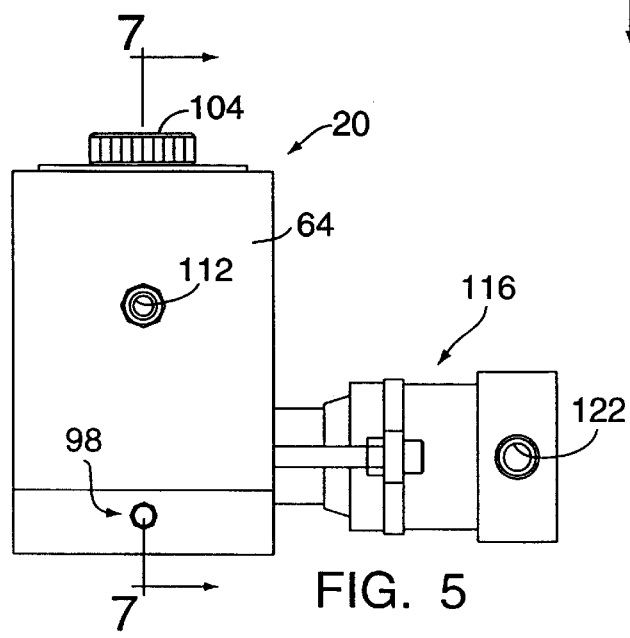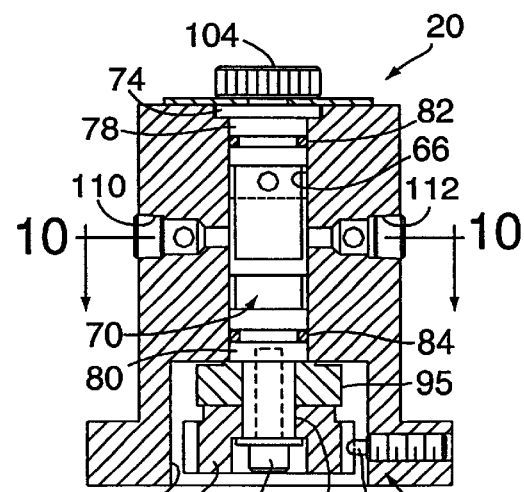
FIG. 4
FIG. 6
FIG. 7
FIG. 5

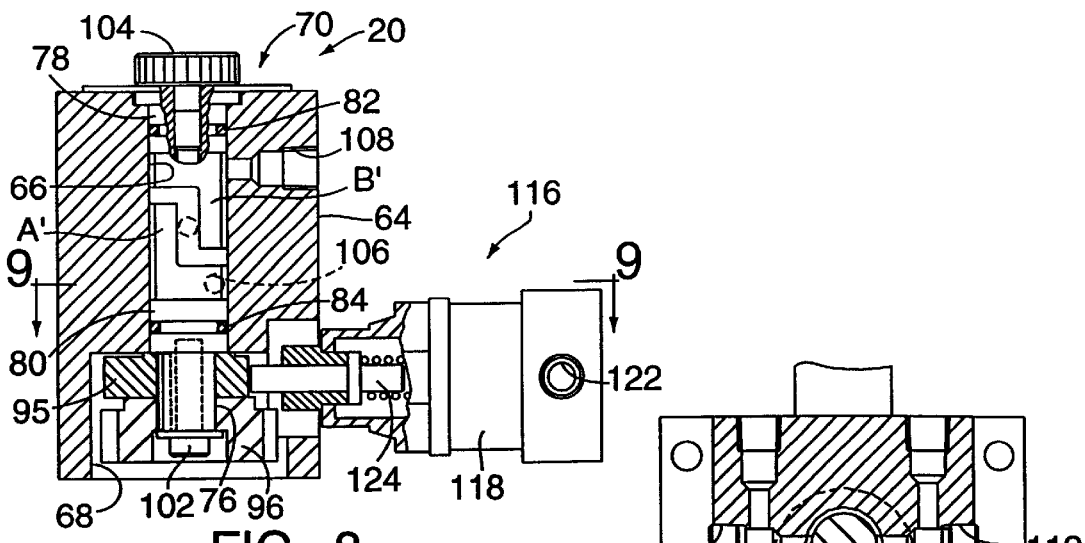
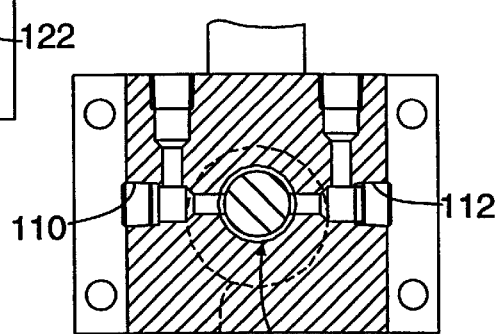
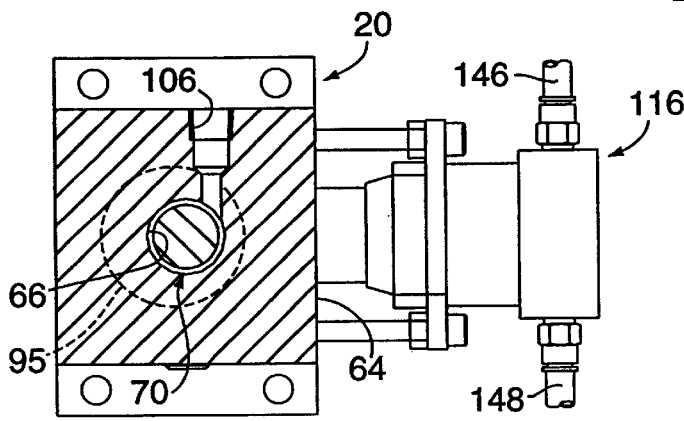
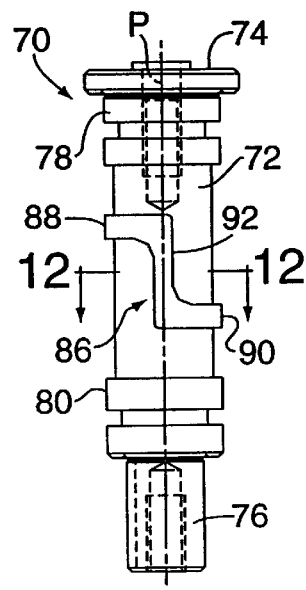
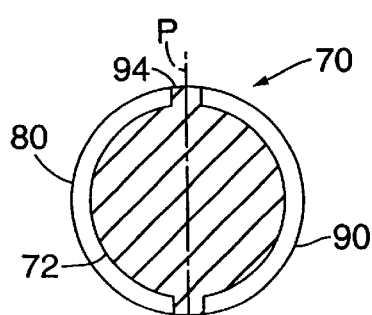
FIG. 8
FIG. 10
FIG. 9
FIG. 11
FIG. 12

PNEUMATIC CHUCK ASSEMBLY

FIELD OF INVENTION

This invention relates in general to chuck assemblies and deals more particularly with an improved pneumatic chuck assembly for a production machine tool and for chucking a workpiece in a machine tool.

BACKGROUND OF THE INVENTION

A fluid actuated rotary chuck assembly of the type with which the present invention is concerned is typically used in a production machine tool to secure and rotate a workpiece while a series of machining operations, such as turning, boring, reaming and tapping, are performed on the workpiece to form an article of manufacture. In the performance of such machining operations it is essential that sufficient clamping pressure be applied to grip and hold the rotating workpiece against the reactive force of an engaging tool. The clamping or chucking pressure required is generally determined by the physical characteristics of the workpiece and the operations that are to be performed upon it. Thus, for example, the clamping pressure necessary to properly secure a workpiece when a turning operation is to be performed on the workpiece will be substantially greater than the clamping force required to hold the same workpiece during a grinding or finishing operation. Further, the clamping force which may be applied to a solid workpiece will be substantially greater than that which may be applied to a hollow or tubular workpiece used in the manufacture of a fragile article. However, in each instance sufficient holding force must be applied to the workpiece to resist the reactive force of a tool without causing distortion of either the workpiece or the article of manufacture produced by the machining process. Each time a machine setup is changed to satisfy the particular requirements of another production run proper consideration must be given to chucking pressure requirements and an appropriate chuck adjustment must be made, when necessary. The present invention is concerned with the aforesaid problems.

It is the general aim of the present invention to provide an improved adjustable, air actuated chuck assembly which enables increased clamping pressure without increase in pressure at the air supply source and which offers a wide range of chucking pressures. It is a further aim of the invention to provide an improved air actuated chuck assembly operated by an adjustable regulating device to enable a machine operator of ordinary skill to rapidly and accurately adjust chucking pressure to satisfy the chucking pressure requirements of a particular job whereby job setup time may be minimized.

SUMMARY OF THE INVENTION

In accordance with the present invention a fluid or air actuated chuck assembly includes a chuck body, a plurality of jaws supported on the chuck body for movement between open and closed positions, means defining a pressure chamber, a double acting piston supported within the pressure chamber for movement in one and an opposite direction within the pressure chamber, jaw actuating means coupled to the piston and to the jaws for moving the jaws between open and closed positions in response to the movement of the piston, and spring biasing means contained within the pressure chamber for normally urging the piston in the one direction to move the jaws to and maintain the jaws in the closed position. The chuck assembly further includes a pneumatic control system for connection to a source of air under pressure and for supplying air under pressure to the pressure chamber for acting in opposition to the spring biasing force to reduce pressure exerted upon the jaws by the jaw actuating means when the jaws are in closed position and for acting in consort with the spring biasing means to increase the force exerted upon the jaws by the jaw actuating means when the jaws are in closed position.

BRIEF DESCRIPTION OF THE DRAWINGS

FIG. 1 is a front elevational view of a chuck assembly embodying the present invention.

FIG. 2 is a somewhat enlarged side elevational view of the chuck assembly shown partially in axial section taken along the line 2—2 of FIG. 1.

FIG. 3 is a fragmentary sectional view taken along the line 3—3 of FIG. 2.

FIG. 4 is a top plan view of a regulating valve for the chuck shown in FIGS. 1 and 2.

FIG. 5 is a side elevational view of the regulating valve of FIG. 4.

FIG. 6 is right end elevational view of the regulating valve shown in FIG. 5.

FIG. 7 is a sectional view taken along the line 7—7 of FIG. 5.

FIG. 8 is a sectional view taken along the line 8—8 of FIG. 6.

FIG. 9 is a sectional view taken along the line 9—9 of FIG. 8.

FIG. 10 is a sectional view taken along the line 10—10 of FIG. 7.

FIG. 11 is a somewhat enlarged side elevational view of the regulating valve spindle.

FIG. 12 is a sectional view taken along the line 12—12 of FIG. 11.

DETAILED DESCRIPTION OF PREFERRED EMBODIMENT

Figures 13, 14:
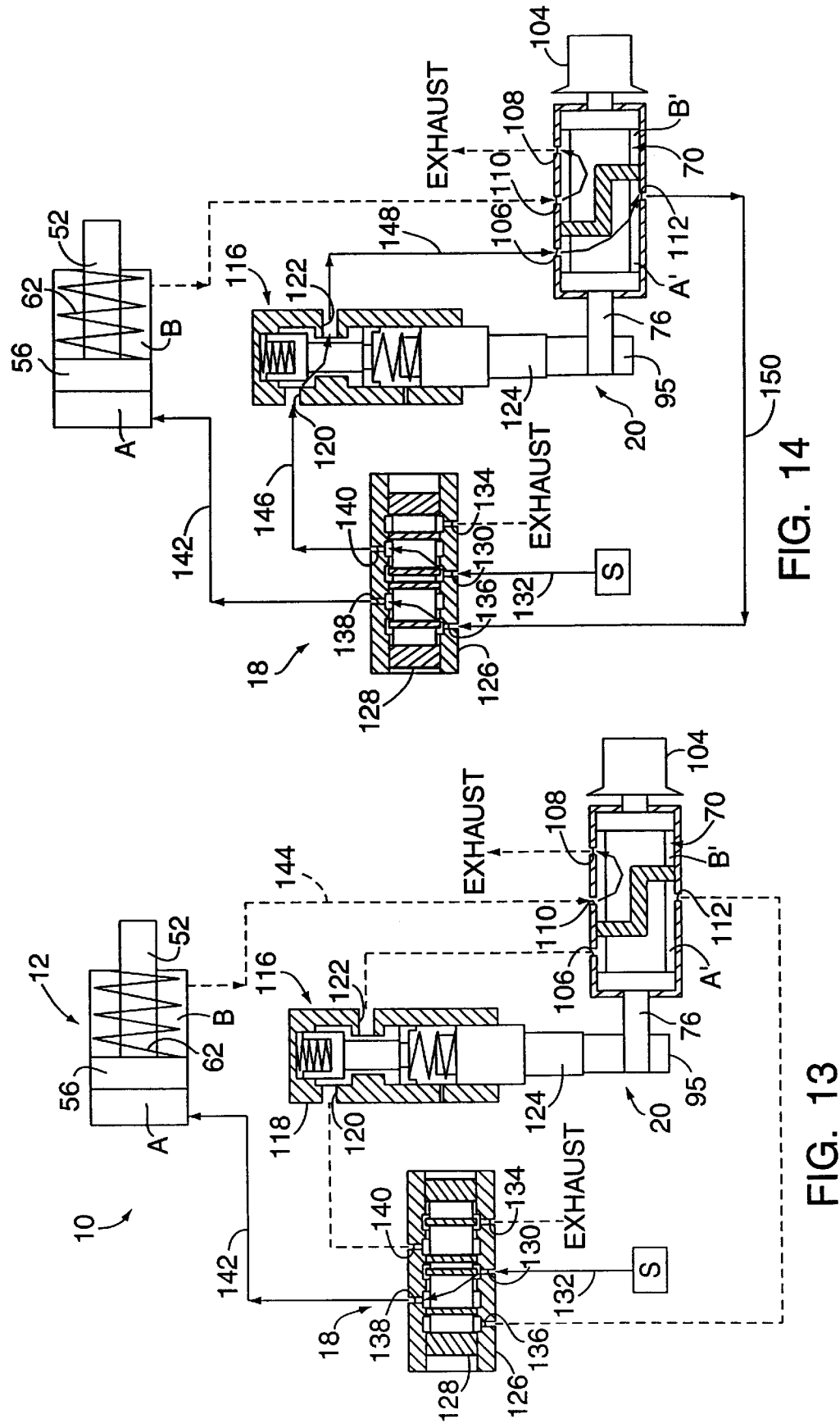
FIG. 13 is a diagrammatic view of the control system showing the chuck in open position.
FIG. 14 is a diagrammatic view showing the chuck in closed position with air pressure working against the springs.

Turning now to the drawings and referring first particularly to FIGS. 1–3, a pneumatic chuck assembly embodying the present invention is designated generally by the reference numeral 10. The illustrated chuck assembly 10 essentially comprises a pneumatically actuated, rotary multi-jaw chuck indicated generally at 12 and a pneumatic control system for operating the chuck and designated generally by the reference numeral 14. The control system receives air under pressure from a supply source indicated generally by the letter S, which may, for example, comprise a conventional air compressor. The chuck jaws, indicated generally at 16, 16, are normally spring biased toward closed or gripping position relative to a workpiece and move toward an open or releasing position in response to the operation of a control valve indicated generally at 18 and which comprises a part of the control system. A manually adjustable regulating valve indicated generally at 20, which also comprises a part of the control system, determines the path of air flow from the control system and to the chuck thereby causing air pressure applied to the chuck to either work in consort with the spring biasing force or in opposition to it. The regulating valve 20 also enables incremental adjustment of the gripping force applied to an associated workpiece by the chuck jaws and may be adjusted to provide a wide range of gripping force, all of which will be hereinafter more fully discussed.

Considering first the chuck 10 in further detail and referring again to FIGS. 1–3, the illustrated chuck 12 has a generally cylindrical chuck body indicated at 22 which includes a front part 24 and a rear part 26. The front part 24 has a radially disposed frontal surface 28 and a generally cylindrical central bore 30 which extends coaxially through the front part and opens through the frontal surface 28. A plurality of equiangularly spaced and radially extending slots 32, 32 equal in number to the chuck jaws, are formed in the chuck body, communicate with the bore 30, and open radially outward through the cylindrical outer peripheral surface of the front part 24 and through the frontal surface 28. The front part 24 further includes a generally cylindrical diametrically reduced and rearwardly projecting rear portion, indicated at 34 in FIG. 2, which defines a radially outward open annular sealing groove containing an O-ring seal indicated at 36. A plurality of generally cylindrical blind bores 38, 38 equiangularly spaced about the axis of the central bore 30 and in axially parallel alignment with the central bore axis open outwardly through the rear surface of the front part 24, substantially as shown in FIG. 2. The rear part 26 comprises a generally cylindrical cup shaped member having a forwardly opening blind cylindrical bore 40 sized to receive the rear end portion 34 in sealing engagement therein. The rear part 26 cooperates with the front part 24 to define a pressure cylinder 42.

A typical chuck jaw 16, as shown in FIG. 2, includes a master jaw 44 and an associated top jaw 46 releasably secured to the master jaw. Each master jaw 44 is received within and substantially complements at least a portion of an associated slot 32. The master jaws 44, 44 are supported within the slots 32, 32 for reciprocal radial movement relative to the chuck body 22. Each of the illustrated master jaws 44, 44 has a T-shaped tail piece or connecting portion 48 at its radially inner end which is received within and complements an associated rearwardly and radially outwardly inclined T-slot 50 in an associated jaw actuating member 52 supported for reciprocal sliding movement within the central bore 30. A radially outwardly open annular sealing groove in the jaw actuating member 52 contains another O-ring seal 54 which serves to further seal the pressure cylinder 42.

The jaw actuating member 52 is operated by a generally cylindrical double acting piston 56 coupled to the actuating member 52 and supported for axial movement within the pressure cylinder 42, as best shown in FIG. 2. The piston 56 carries an annular O-ring seal 57, which sealingly engages the wall of the pressure cylinder 42, has generally radially disposed front and rear surfaces indicated, respectively, at 58 and 60, and divides the pressure cylinder 42 into two separate chambers of variable volume which includes a first or rear chamber section hereinafter referred to as chamber A and a second or front chamber hereinafter referred to as chamber B. A plurality of compression springs 62, 62 located within the chamber B normally bias the piston rearwardly and in the direction of the chamber A. Each spring 62 is received and partially contained within an associated blind bore 38 and acts between the front part 24 and the piston rear surface 60. The springs 62, 62 exert a substantially constant or unchanging force upon the piston 56 for workpieces of the same clamping diameter. In the illustrated chuck 10 the spring biased piston 56 normally exerts an axially rearwardly directed pulling force upon the jaw actuating member 52 urging the chuck jaws 16, 16 radially inward toward closed or clamping position relative to the outside diameter (OD) of a cylindrical workpiece disposed between and secured by the chuck jaws. In FIGS. 1 and 2 a typical solid cylindrical workpiece W is shown clamped at its outside diameter (OD) in the chuck 12.

Considering now the control system 14 and referring particularly to the regulating valve as oriented in FIGS. 4–12, the presently preferred regulating valve 20 has a valve body 64 which defines an axially vertically disposed stepped cylindrical spindle bore 66. The spindle bore opens into a diametrically enlarged generally cylindrical downwardly open cup shaped recess 68 at the lower end of the valve body. A generally cylindrical valve spindle, indicated generally at 70 and best shown in FIGS. 11 and 12 is axially supported within the spindle bore 66. The valve spindle 70 has a body portion 72, a diametrically enlarged generally cylindrical upper end portion 74, and a diametrically reduced generally cylindrical shank 76 at its lower end. A pair of axially spaced apart and diametrically enlarged cylindrical collars 78 and 80 at the upper and lower ends of the spindle body 72 cooperate with the spindle bore 66 to coaxially support the valve spindle 70 within the valve body 64. The collars 78 and 80 have coaxial annular radially outwardly open sealing grooves therein containing elastomeric O-ring seals indicated at 82 and 84, respectively, which cooperate in sealing engagement with the wall of the spindle bore 66. The spindle body 72 has an integral land indicated generally at 86 and partially defined by axially spaced apart upper and lower semi-circular land portions 88 and 90 located, respectively, at diametrically opposite sides of an axial plane through the spindle 70, the latter plane being indicated by the letter P in FIGS. 11 and 12. The land 86 is further defined by a pair of diametrically opposed land sections 92 and 94 which extend in axial directions between the ends of semi-circular portions 88 and 90 as best illustrated by FIG. 11 where the land section 92 is shown. The valve spindle 70 is received within the spindle bore 66 with the collars 78 and 80 in sealing engagement with the wall of the bore 66 whereby the spindle 70 is supported for coaxial angular movement within the latter bore with the outer surface of the land 86 disposed in sliding engagement with the bore wall. The land 86 cooperates with the spindle collars 78 and 80 and the wall of the bore 66 to define separate upper and lower movable valve chambers within the control valve 20. The valve chambers are hereinafter designated valve chamber A' and valve chamber B' and best shown in FIGS. 7 and 8.

An eccentric cam 95 is mounted on and keyed in nonrotatable engagement to the spindle shank 76 within the recess 68. The valve spindle 70 is arranged for uniform incremental angular adjustment relative to the valve body 64 and for this reason a cogwheel 96 is also mounted on and keyed to the spindle shank 76 immediately below the cam 95. A detent member shown in FIG. 7 and indicated generally at 98 and mounted on the valve body 64 and has a detent plunger 100 which extends into the recess 68 and engages the cogwheel 96 between adjacent cogs thereon to releasably retain the valve spindle 70 in a selected position of angular adjustment relative to the valve body 64, as will be hereinafter further discussed. A fastener 102 threadably engaged in the lower end of the spindle shank 76 retains the spindle assembly, which includes the valve spindle 70, the cam 95 and the cogwheel 96, in assembly with the valve body 64. A calibrated adjusting knob or thimble 104 connected in nonrotatable engagement with the upper end of the valve spindle 70 facilitates manual incremental angular adjustment of the regulating valve 20, as will be hereinafter further discussed.

A plurality of valve ports threaded to receive pressure hose fittings are formed in the valve body 64 and communicate with the valve chambers A', B' as hereinafter described to control the directional flow of air under pressure through the regulator valve 20. Specifically, the valve body 64 has a first valve port 106 which is at all times in communication with the valve chamber A', a second valve port or exhaust port 108 which is at all times in communication with the valve chamber B' and a pair of diametrically opposed valve ports, 110 and 112 each of which may be placed in communication with an associated one of the valve chambers A' or B'. It should also be noted that the spindle 70 has a "turning point" at which point both of the valve ports 110 and 112 are simultaneously closed by the axially extending land sections 92 and 94, for a purpose which will be hereinafter further evident.

As previously noted, the regulating valve 20 is also employed to regulate the pressure of air fed to the chuck 12 to operate the chuck and for this reason a pressure regulator indicated generally at 116 is mounted in fixed position on the valve body 64. The illustrated pressure regulator 116 is a commercially available pressure regulator of poppet valve type and includes a regulator body 118 which has an input port 120 and an output port 122. The input and output ports 120 and 122 are internally threaded for connection to pressure hose fitting which connect the components which comprise the control system 14. A plunger 124 projects from the regulator body 118, extends into the recess 68 and engages the cam 95. The camming surface on the cam 95 is configured to cooperate with the plunger 124 so that uniform incremental angular adjustment of the cam 95 in response to incremental rotation of the adjusting knob or thimble 104 provides uniform incremental linear adjustment of the air output from the air regulator 116 at the output port 122.

The present invention may be practiced with any suitable commercially available pressure regulator which may adapted to operate in the manner illustrated in the drawings and hereinbefore described. However, the presently preferred regulator 116 comprises a miniature 14R Series Airline Regulator of a type available from Parker Hanifin Corp., Elyria, Ohio, 44035.

Figure 15:
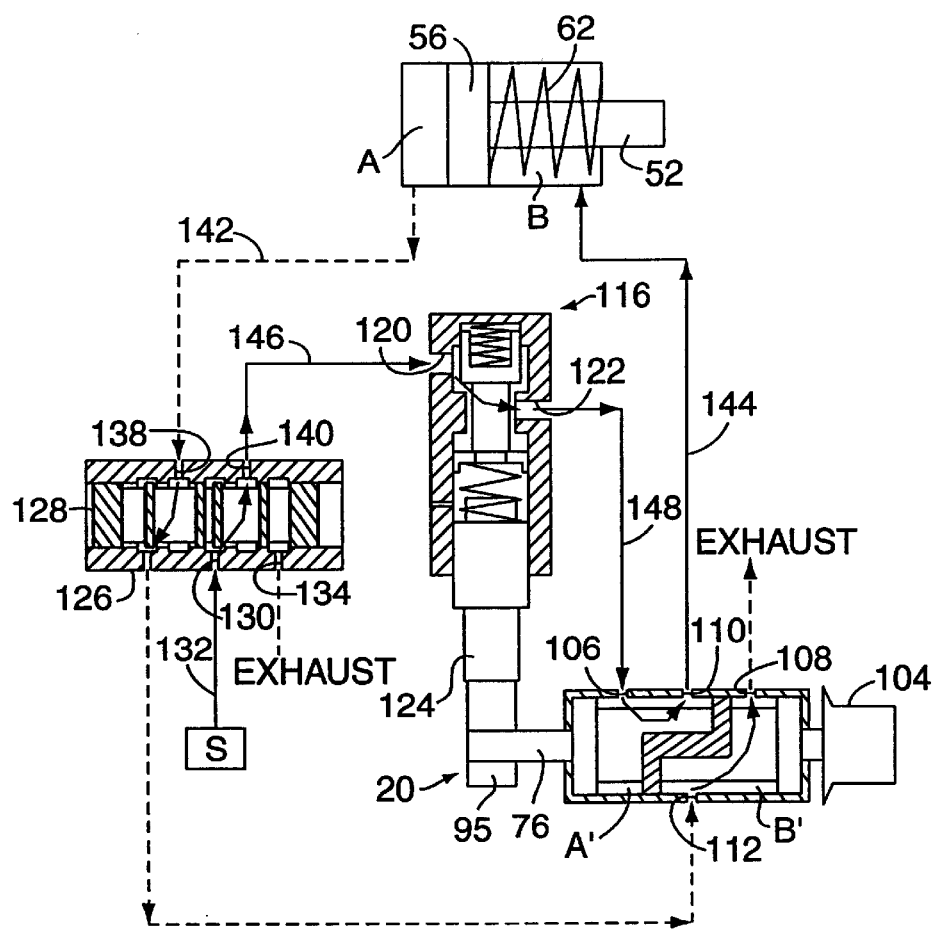
FIG. 15 is a diagrammatic view showing the chuck in closed position with air pressure working with the springs.
Figure 18:
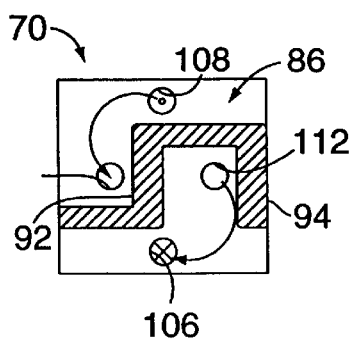
FIG. 18 is a developed view of the regulating valve spindle shown in one angular position of adjustment relative to the valve ports.
Figure 19:
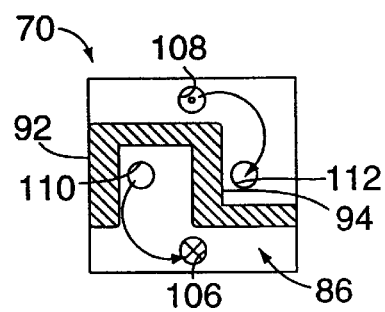
FIG. 19 is similar to FIG. 18 but shows the regulating valve spindle in another angular position of adjustment relative to the valve ports.

The presently preferred control valve 18 comprises a 4-way, 5-port, 2-position lever operated air control valve of a type commonly used to operate double acting air cylinders and best shown in FIGS. 13–15. The illustrated control valve is a spool valve which has a housing 126 defining a bore within which a valve spool 128 is supported for axial shifting movement between two positions corresponding to open and closed positions of the chuck 12. The housing 126 defines an inlet port 130, an exhaust port 134, and valve ports 136, 138 and 140. Each port is internally threaded to receive a pressure hose fitting. A manually movable control lever (not shown) shifts the valve spool 128 to alter the directions of the air flow paths through the control valve 18, as will be evident from the further description which follows. Any suitable commercially available control valve may be used in practicing the invention. However, the presently preferred valve is a Parker "E" Series Air Control Valve of a lever operated, manual return type, Model No. E 2083 1000, available from Parker Hanifin Corp., Elyria, Ohio 44035.

The further arrangement of the control system 14 and the manner in which the control system is employed to operate the chuck 12 will be best understood with reference to the diagrammatic and graphic illustrations of FIGS. 13–20. In the examples which follow, air is received from the supply source S at a pressure of 100 psi and the constant force compression springs 62, 62 contained within the piston chamber B exert force upon the piston rear surface 60 equivalent to a pressure of 90 psi acting over the entire radial cross sectional area of the piston 56. Paths of air under pressure are shown in full line. Exhaust flow paths are indicated by broken lines.

Prior to using the chuck 12 in the production of an article of manufacture, the clamping pressure required to properly secure the workpiece from which the article is to be made should be determined. After the required clamping pressure has been determined, the control system 14 is adjusted, as necessary, to apply the desired clamping pressure to the workpiece.

The chuck 12 is opened by manually operating the control lever on the control valve 18 to shift the valve spool 128 to the one of its two positions which corresponds to the open position of the chuck. In FIG. 13 the control system 14 is shown after the operating lever (not shown) on the control valve 18 has been shifted to open chuck position. Air under pressure received from the supply source S enters the valve 18 through an air line 132 connected between the supply source S and the air inlet port 130 and leaves the valve 18 through the port 138 and the air line 142 which is connected to the port 138 and communicates with the piston chamber A. Thus, air at full line pressure (100 psi) is fed from the supply source S directly into the piston chamber A in bypassing relation to the regulating valve 20.

When the regulating valve 20 is in the position shown in FIG. 13 air is exhausted from the piston chamber B through an air line 144 connected to the valve port 110 on the regulating valve 20, through the valve chamber B' and to atmosphere through the normally open exhaust valve 108. Since the air pressure (100 psi) acting on the A side of the piston 56 is greater than the spring pressure (90 psi) acting upon the B side of the piston, the piston 56 will move to the right, as it appears oriented in the drawings, causing the jaw actuating member 52 to exert a pushing force on the chuck jaws 16, 16, thereby urging the chuck in a radially outward direction and toward open position. The chuck jaw 16, 16 will remain in open position for as long as the air pressure within the piston chamber A exceeds opposing the pressure exerted upon the piston by the springs 62, 62 contained within the piston chamber B.

Referring now to FIG. 14, the chuck assembly 10 is shown after the control valve 18 has been shifted from its open chuck position to its closed chuck position. Air under pressure received from the supply source S enters the control valve 18 through the inlet port 130 and leaves the control valve 18 through the valve port 140 and an associated air line 146 connected in communication with the input port 120 on the pressure regulator 116.

When the thimble 104 is set in its zero (0) position air under pressure leaves the regulator 116 throughout the output port 122 at a regulated pressure of 90 psi. The output port 122 is connected by an air line 148 to the valve port 106 which opens into the valve chamber A' of the regulating valve 20. Air at 90 psi leaves the valve chamber A' through the valve port 112 and an airline 150 connected between the port 112 and the port 136 on the control valve 18 which directs the pressurized air to the piston chamber A through the air line 142. Thus, when the thimble 104 is set at its zero (0) position the air pressure exerted upon the piston rear surface 58 within the piston chamber A is substantially equal to the spring pressure exerted upon the piston frontal surface 60 by the springs 62, 62 contained within the piston chamber B. The resultant condition is illustrated graphically in FIG. 16 where the pressure (90 psi) exerted by the constant force springs (62, 62) is indicated by the plotted curve 151 whereas the regulated air pressure delivered to the chuck is indicated by the curve 152. It will be noted that the curves 151 and 152 intersect at the point 154 producing a resultant pulling force of zero (0) acting upon the jaw actuator 52.

In the illustrated embodiment of the invention (FIG. 16) each successive incremental adjustment of the thimble 104 from the zero (0) position causes a reduction of 20 psi pressure at the air pressure regulator output port 122 resulting from a change in the position of the cam 95 relative to the plunger 124 on the pressure regulator 116. Thus, each incremental adjustment of the thimble 104 results in a 20 psi pressure differential between spring pressure acting upon the piston rear surface 60 within the piston chamber B and the opposing air pressure acting upon the piston frontal surface 58 within the piston chamber A. As the air pressure in the piston chamber A is reduced the force exerted by the springs upon the chuck jaws increases linearly as indicated by the resulting pulling force represented by the curve plotted along 156 in FIG. 16.

Figure 20:
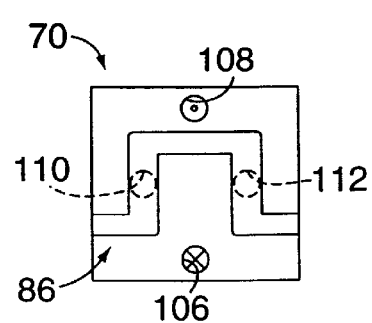
FIG. 20 is similar to FIGS. 18 and 19 but shows the regulating valve spindle at the "turning point".
Figure 16:
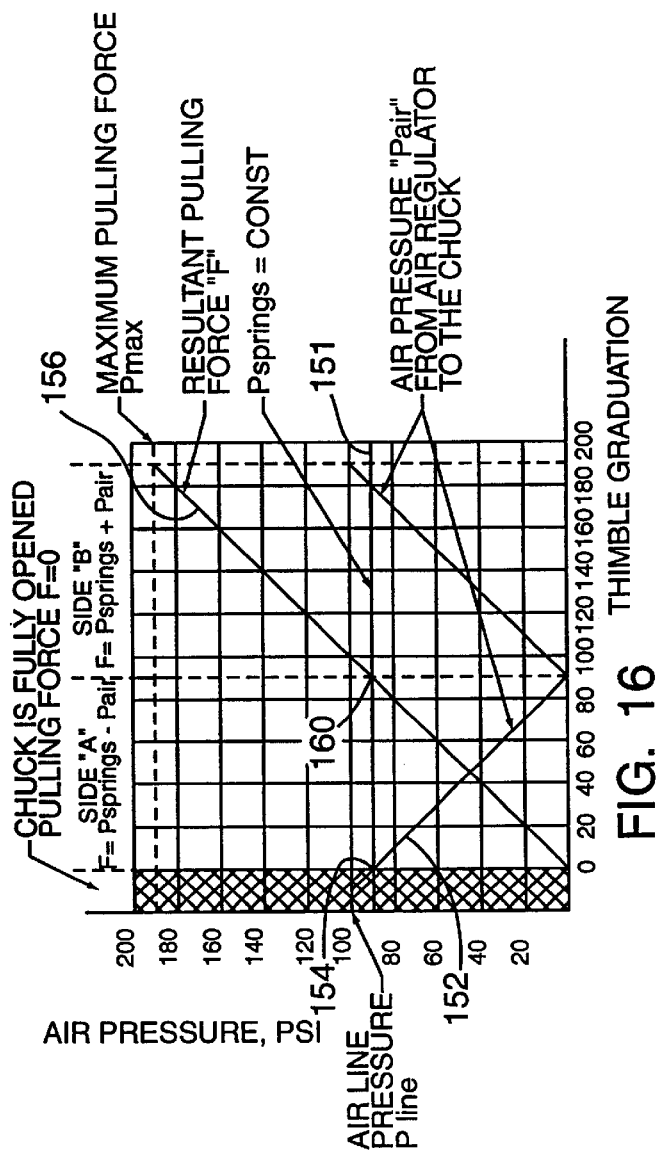
FIG. 16 is a graphic illustration of regulated air pressure supplied to the chuck from the air regulating valve.
Figure 17:
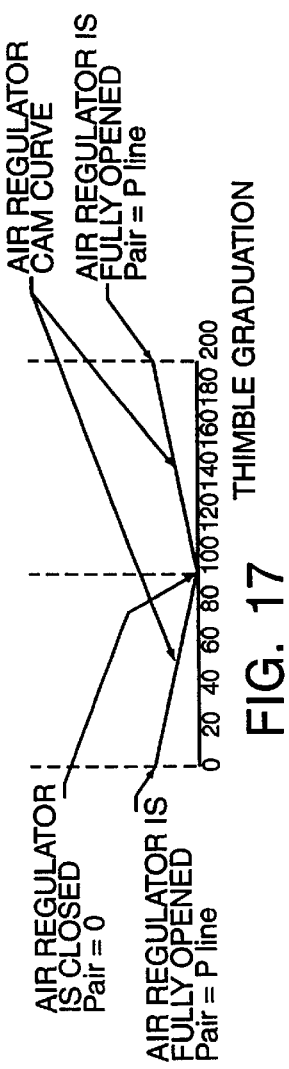
FIG. 17 is an air regulator cam curve.

Each incremental adjustment of the thimble 104 also results in a change in the angular position of the axially oriented and diametrically opposed land sections 92 and 94 on the valve spindle 70 until a point is reached where the diametrically opposed ports 110 and 112 are closed by the land sections 92 and 94, as shown in FIG. 20. At this "turning point", the air pressure acting upon the piston 56 is reduced to zero (0) whereas the effective spring pressure remains at 90 psi. This "turning point" is illustrated graphically in FIG. 16 by the intersection of the spring pressure curve 151 and the resultant pulling force curve indicated at 156. The latter intersection is designated by the numeral 160. At the turning point, illustrated in FIG. 20 the regulated pressure at the output port 122 on the pressure regulator 116 has been reduced to zero (0) by the action of the cam 95 upon the plunger 124. The linear relationship between the adjusted incremental positions of the cam 95 and the regulated pressure output of the pressure regulator 116 is shown in FIG. 17.

Referring now to FIG. 15, further incremental adjustment of the thimble 104 beyond the turning point moves the land portions 92, 94 relative to the regulating valve ports 110, 112 causing an immediate shift in the air flow pattern so that regulated air under pressure now enters the valve chamber A' through the port 106 and leaves the valve chamber A' through the port 110 and the air line 144 thereby pressurizing the piston chamber B. The shift of the land 86 from its turning point also opens the piston chamber A to exhaust whereby it is exhausted along the broken line path shown in FIG. 15 to the exhaust port 108 and to atmosphere.

Further incremental adjustments of the thimble 104 beyond the turning point causes the pressure regulator cam 95 to depress the plunger 124 to produce linear increases in air pressure within the piston chamber B so that the assisting air pressure acts in consort with the spring pressure. In the example graphically illustrated in FIG. 16 each increment of thimble adjustment adds 20 psi force to the 90 lb. force exerted by the springs 62, 62 thereby increasing the pulling force acting upon the jaw actuating member 52. A maximum pulling force of 190 psi may be attained from the combined action of the springs 62, 62 (90 psi) and the air under pressure (100 psi) when the air regulator 116 is fully opened by the cam 95.

The invention has been illustrated and described with reference to the chuck assembly 10 which is particularly adapted to grip a cylindrical workpiece at its outside diameter (OD). However, it should be understood that the present invention may also be practiced with a chuck for gripping a tubular workpiece at its inside diameter (I.D). If the chuck is provided with counterbalanced jaws at opposite sides of the chuck axis of rotation, movement of each jaw inwardly and toward the axis produces a corresponding radially outward movement of an opposing counterbalancing jaw at the opposite side of the axis. The radially outwardly movable jaws are employed for ID gripping. A further disclosure of a chuck of the aforesaid type is found in the U.S. patent application of Oleg Tabachenko, entitled Dynamic Compensating Machine Tool Chuck, Ser. No. 08/887,598, filed Jul. 3, 1997, assigned to the assignee of the present invention and hereby adopted by reference as part of the present disclosure.

We claim:

1. A pneumatic chuck assembly comprising a chuck body, a plurality of chuck jaws supported on said chuck body for movement between open and closed positions, means for defining a pressure chamber, a piston supported within said pressure chamber for movement in one and an opposite direction within said pressure chamber, chuck jaw actuating means coupled to said piston and to said chuck jaws for moving said chuck jaws between said open and closed positions in response to movement of said piston, spring biasing means for applying mechanical pressure to said piston and normally urging said piston in said one direction to urge said chuck jaws toward and maintain said chuck jaws in said closed position, said chuck jaws in said closed position being operative to exert clamping pressure upon a workpiece to secure the workpiece to said chuck body, and a pneumatic control system including manually adjustable regulating means for introducing opposing air under pressure into said pressure chamber to act upon said piston in opposition to said biasing means to overcome said mechanical pressure applied to said piston by said spring biasing means, incrementally reducing the pressure of the opposing air under pressure until the pressure of the opposing air under pressure reaches zero, changing the direction of flow of air under pressure into said pressure chamber when the pressure of the opposing air reaches zero to cause assisting air under pressure to enter said chamber and act in consort with said spring biasing means, and incrementally increasing the pressure of said assisting air under pressure until the pressure of the assisting air under pressure equals the mechanical pressure applied to said piston by said spring biasing means.

2. The pneumatic chuck assembly set forth in claim 1 wherein said mean for defining said pressure chamber comprises said chuck body.

3. The pneumatic chuck assembly set forth in claim 1 wherein said spring biasing means comprises a plurality of springs disposed within said pressure chamber and acting between said chuck body and said piston.

4. The pneumatic chuck as set forth in claim 3 wherein said springs comprise compression springs for exerting a substantially constant biasing force upon said piston for workpieces of the same clamping diameter.

5. The pneumatic chuck assembly set forth in claim 1 wherein said pneumatic control system includes a control valve for supply said air under pressure to said manually adjustable regulating means and for bypassing said manually adjustable regulating means to supply air under pressure directly to said pressure chamber to move said piston in opposition to said spring biasing means and move said chuckjaws to and maintain said chuck jaws in said open position.

6. The pneumatic chuck assembly set forth in claim 5 wherein said control valve is further characterized as a 4-way, 5 port 2 position lever operated control valve.

7. A pneumatic chuck assembly comprising a chuck body defining a cylindrical piston chamber, a piston supported for reciprocal axial movement within said piston chamber and dividing said pistol chamber into two discrete chamber sections of variable volume including first and second chamber sections, a plurality of chuck jaws supported on said chuck body for movement between open and closed positions, jaws actuating means coupled to said piston and to said chuck jaws for moving said chuck jaws between said open and closed positions in response to the movement of said piston, spring biasing means disposed in said second chamber section for urging said piston in the direction of said first chamber section to urge said jaws toward said closed position, and exert a predetermined clamping pressure upon a workpiece disposed between said chuck jaws to secure the workpiece to said chuck body, and a pneumatic control system for receiving air under pressure from a supply source and including incrementally adjustable regulating means for introducing opposing air under pressure into said first chamber section and exhausting air from said second chamber section to overcome mechanical pressure applied to said piston by said spring biasing means, incrementally reducing the pressure of the opposing air under pressure until the pressure of the opposing air under pressure reaches zero, altering the direction of air flow to interrupt the flow of opposing air under pressure into said first chamber section and introducing assisting air under pressure into said second chamber section while exhausting air under pressure from said first chamber section when said opposing air under pressure reaches zero, and incrementally increasing the pressure of said assisting air under pressure until the pressure of said assisting air under pressure equals the mechanical pressure applied to said piston by said spring biasing means.

8. The pneumatic chuck assembly set forth in claim 7 wherein said springs comprise springs for exerting a substantially constant force upon said piston for workpieces of the same clamping diameter.

9. The pneumatic chuck assembly set forth in claim 7 wherein said control system includes manually operable control means for moving said chuck jaws to said and maintaining said jaws in said open position independently of the operation of said incrementally adjustable regulating means.

10. The pneumatic chuck assembly set forth in claim 7 wherein said regulating means is incrementally adjustable to provide linear regulation of said air under pressure.

11. A pneumatic chuck assembly comprising a chuck body, a plurality of chuck jaws supported on said chuck body for movement between open and closed positions, means for defining a pressure chamber, a piston supported within said pressure chamber for movement in one and an opposite direction within said pressure chamber, chuck jaw actuating means coupled to said piston and to said chuck jaws for moving said chuck jaws between said open and closed positions in response to movement of said piston, spring biasing means for normally urging said piston in said one direction to urge said chuck jaws toward and maintain said chuck jaws in said closed position, said chuck jaws in said closed position being operative to exert clamping pressure upon a workpiece to secure the workpiece to said chuck body, and a pneumatic control system including manually adjustable regulating means for establishing paths of air flow from said control system to said chuck to cause air under pressure applied to said chuck to work in opposition to or in consort with said spring biasing means and to simultaneously incrementally linearly adjust said clamping pressure.

12. A pneumatic chuck assembly as set forth in claim 11 wherein said manually adjustable regulating means comprises a spindle valve including a valve housing having a spindle bore and a valve spindle coaxially supported within said bore for incremental angular movement relative to said housing and having an integral land cooperating with said housing to define a pair of chambers movable relative to said housing.

13. A pneumatic chuck as set forth in claim 12 wherein said spindle valve includes a plunger operated pressure regulating valve mounted on said housing and an eccentric cam mounted in fixed position on said spindle and engaged with said plunger to operate said pressure regulating valve in response to incremental angular movement of said spindle relative to said housing.

* * * * *